Patented Apr. 26, 1938

2,115,425

UNITED STATES PATENT OFFICE 2,115,425

COMPOSITION FOR TREATING METALLIC SURFACES

Orville V. McGrew, Chicago, Ill.

No Drawing. Application October 10, 1934, Serial No. 747,741. Renewed November 15, 1937

3 Claims. (Cl. 134—51)

This invention relates to improvements in composition for treating metallic surfaces, and more particularly for preserving, protecting and insulating metallic structures such as railway car and automobile bodies, ships, structural steel buildings and all metallic surfaces against deterioration from rust and corrosion, transmission of heat and sound, as well as the creation or amplification of sound-producing vibrations within the structure.

In short, the object of the invention is to provide an efficient and economical surface preservative, heat-insulating and sound-deadening composition for general use in building or structural work, capable of being sprayed on to the surfaces to be treated to any desired thickness, and after a short period of drying, to form a somewhat elastic spongy coating having the combined properties hereinabove enumerated.

Moreover, in its preferred form the composition has a definite cellular texture calculated to increase its capacity to resist the passage of sound and heat therethrough and likewise to absorb vibration set up in steel plates and structural members.

Referring now to the ingredients which enter into the composition and the general process followed in combining them, the base is preferably a mixture of gilsonite, asphalt and fish oil pitch melted down and then aerated by blowing air through the molten mass to give it the desired spongy or cellular texture, whereupon suitable hydrocarbons such as light mineral oils and naphtha are added as solvents and finally quantities of asbestos fibre and sawdust are incorporated as a binder and filler.

The following are the proportions of the preferred ingredients entering into the composition in terms of approximate percentages by weight:

| | Percent |
|---|---|
| Gilsonite | 19 |
| Mid-Continent asphalt | 11 |
| Sardine fish oil pitch | 16 |
| Light mineral oil (oleum spirits) and naphtha | 36 |
| Asbestos fibre | 4 |
| Sawdust | 14 |

The process followed in preparing the composition will be best understood by describing the procedure in making up an average batch using actual weights:

An asphalt still or like apparatus is used for the melting and mixing of the basic ingredients, the same being heated in any suitable manner and also equipped with a blowing device whereby air can be blown under pressure through the molten mass in the still. Thus at the outset of the process, 245 pounds of gilsonite, 142 pounds of asphalt and 205 pounds of the fish oil pitch are charged into the still and the temperature brought up to about 350° F. At this point the blowing is commenced and continued for about twelve hours, this being the time required to bring all of the ingredients up to the melting point of, say, 215° F. This means, of course, that while the temperature of the still has been raised to a considerably higher temperature, even as high as 525° F., the increased melting point of the still ingredients due to constant cooling effect of the air blown through the mass is acquired only after the temperature of the still has been gradually brought up to maximum. When the melting point has been reached the basic ingredients are then in solution and by reason of the air blown therethrough are reduced to a homogeneous mixture, thoroughly impregnated with minute globules of air and hence of a more or less fluffy or spongy consistency.

Now when the melting point has been reached and the mass reduced to the proper consistency the blowing of the air therethrough is discontinued and the still allowed to cool down to about 300° F., whereupon the liquid hydrocarbons are added.

This is preferably accomplished by first emptying some 200 pounds each of oleum spirits and naphtha into a separate tank and by means of connecting pipe lines pumping the hydrocarbons from the tank into the still and thence back into the tank. In other words circulating the entire mixture through the still and tank until the whole has been thoroughly mixed together.

When this step has been completed, the mixture is next pumped into another and preferably closed tank capable of being maintained at a temperature of 150° F. by steam coils or otherwise, and while in this tank the asbestos fibre and dried sawdust are added in amounts of 60 pounds of the fibre and 160 pounds of the sawdust. This step in the process requires about 12 hours also, as it is necessary to agitate the mass for a considerable period of time in order to accomplish the complete absorption by the fibre and sawdust of the liquefied mixture. With the addition of the asbestos fibre and sawdust the mixture assumes more or less its ultimate consistency, although when allowed to cool down to normal temperature it is slightly more viscous but yet sufficiently fluid to be capable of being sprayed onto a surface without reheating, diluting or other treatment.

In its completed state ready for application, the composition retains to a large degree its initial light spongy texture attributable primarily to the blowing treatment in the earlier stages of preparation, which physical characteristic it retains subsequent to its application.

Thus, as previously pointed out, it is preferably applied as a coating or layer of the desired thickness adhering tenaciously to the surface without running or spreading unevenly after its initial application. A short period is required for setting and drying after which it becomes a tough but slightly elastic coating of a rather coarse surface texture with intercommunicating voids or channels extending throughout the body of the mass. The composition, however, is not porous in the sense that it permits the passage of moisture therethrough, but rather approaches what may be termed a cellular texture which serves not only to increase the bulk, thus permitting greater surface coverage per unit of volume of the composition, but it is also of marked advantage in increasing the sound and heat insulating properties of the coating.

In setting forth the preferred embodiment of my invention I am aware that different substances may be substituted for those mentioned with equally satisfactory results as well as different grades or sources of the same ingredient. Thus in specifying asphalt I prefer to use the kind known to the trade as "Mid-Continent" chiefly because it is more plentiful and therefore less expensive. So too, I prefer to use a sardine fish oil pitch in preference to other fish or drying oils or even raw linseed oil, since it is considerably cheaper and quite as satisfactory. In short, other things being equal, I prefer to use the less expensive ingredients so long as the quality is not affected by so doing. Moreover, the proportions of the ingredients employed may be varied somewhat from those herein set forth without materially affecting the character, properties, and usefulness of the composition for the purposes for which it is intended.

Having set forth the invention in its preferred embodiment,

I claim:

1. The method of producing a composition of matter for the purpose described consisting of heating predetermined quantities of gilsonite, asphalt and fish oil pitch in a suitable still until reduced to a molten state, forcing air through the molten mass until thoroughly aerated, discontinuing the aerating of the molten mass and allowing it to cool to a temperature slightly above the melting point, mixing a predetermined quantity of light hydrocarbon solvent with the molten mass, reducing the temperature of the resulting mixture to approximately 150° F., incorporating given quantities of asbestos fibre and sawdust into the mixture and agitating the same until said asbestos and sawdust are completely saturated.

2. The method of producing a composition of matter for the purpose described consisting of heating predetermined quantities of gilsonite asphaltum and fish oil pitch in a suitable still until reduced to a molten state, forcing air under pressure through the molten mass until thoroughly aerated and the melting point of the molten mass is at a temperature of approximately 215° F., adding a predetermined quantity of light hydrocarbon solvent to the molten mass, removing the resulting mixture from said still to a closed tank maintained at a temperature of approximately 150° F., and incorporating given quantities of asbestos fibre and dried sawdust into the mix and agitating the whole until the asbestos and sawdust have become completely saturated.

3. The method of producing a composition of matter for the purpose described consisting of heating predetermined quantities of gilsonite, crude asphalt and fish oil pitch in a suitable still until reduced to a molten state, forcing air under pressure through the molten mass until thoroughly aerated, discontinuing the aerating of the molten mass and allowing it to cool at a temperature slightly above the melting point, mixing a predetermined quantity of light hydrocarbon solvent with the molten mass by pumping the same into the still from a suitable receptacle, removing the resulting mixture from said still to a closed tank and maintained therein at a temperature of approximately 150° F., and incorporating given quantities of asbestos fibre and dried sawdust into the mix and agitating the whole until the asbestos and sawdust have become completely saturated.

ORVILLE V. McGREW.